Patented May 26, 1936

2,042,296

UNITED STATES PATENT OFFICE 2,042,296

INSECTICIDE

Hyym E. Buc, Roselle, N. J., assignor to Standard Oil Development Company, a corporation of Delaware No Drawing. Application March 12, 1931, Serial No. 522,178

5 Claims. (Cl. 167—24)

In a copending application entitled "Process for producing alkylated phenols", Serial No. 522,177 filed on March 12, 1931, I have disclosed a method for preparing aryl alkyl ethers from phenols and aliphatic or cyclo olefins. Briefly, this method consists of reacting upon the mixture of phenol and an olefin or cyclo olefin with concentrated sulfuric acid, removing the acid by washing with water and distilling the crude product obtained whereby secondary alkyl phenol and phenyl ether are obtained. The phenol may be monohydric or polyhydric or an hydroxyl compound containing condensed nuclei, such as naphthol.

Certain experiments which I have carried out proved that the aryl alkyl ethers have a characteristic and very useful property consisting of their solvent action for rotenone and other active insecticidal principles, which I shall term shortly rotenoids, of certain plants known as fish poisons, such as derris, cube, etc. Furthermore, the phenyl ethers not only are solvents, themselves, for rotenone and rotenoids, but also increase the solubility of such insecticidal principles in oils, while such principles by themselves are very insoluble in oil. The aryl alkyl ethers act, therefore, as mutual solvents for the rotenone, rotenoids, and the oil respectively.

The solvent action of the aryl alkyl ethers becomes a very valuable factor in the preparation of certain insecticidal oils.

Kerosene, either alone or containing pyrethrum extract, has long been used for killing household insects, such as flies, roaches, bed bugs, etc. The killing power of such kerosene is greatly increased by dissolving rotenone in it. Up to the present time very large amounts of the solvent were required in order to keep the rotenone and rotenoids dissolved in the kerosene. I have prepared a stable kerosene solution containing 0.25% of rotenone with only 0.75% of secondary hexyl phenyl ether as mutual solvent. No similar result has been obtained up to the present time with any of the usual solvents, such as benzol, etc. In domestic sprays usually a much smaller amount of rotenone than the one given above will be sufficient, and 0.02–0.2% of rotenone in the kerosene may be sufficient depending on the effect desired.

The kerosene or similar naphtha fractions used in such household insecticides are relatively non-volatile; easily volatizable petroleum oils such as petroleum ether are unsatisfactory for use as household insecticides due to their inflammability.

Even more important than the case of household sprays is the preparation of horticultural and agricultural oil sprays containing rotenone or rotenoids held in solution in the oil in quantities of about 0.1% or more of rotenone or an equivalent amount of rotenoids. The amount of aryl alkyl ether necessary to keep the rotenone and rotenoids in stable solution in the oil is between three and fifteen times the weight of the rotenone and the rotenoids. The oil used for such purpose is usually a viscous non-volatile oil, such as gas oil or light lubricating oil, but very often lighter oils, such as kerosene, are also used for insecticidal sprays.

It is known to those skilled in the art that it is experimentally difficult to prepare an oil spray which will efficiently destroy the insect pests on the trees and at the same time be entirely safe and harmless for the tree. If the amount of oil is reduced in the horticultural spray well below 1–2%, the same becomes harmless to the tree but at the same time it loses its insect killing power. By the addition of about 0.1% to .5% of rotenone or an equivalent amount of rotenoids the insecticidal value of the oil spray is increased to such an extent that the control of the pests becomes efficient even at concentrations far below 2% of oil, say 1% of oil in the spray.

The following example will illustrate the present invention:

0.5% rotenone, 5% secondary hexyl cresyl ether, 94.5% petroleum oil having a gravity of 27° A. P. I. and a viscosity of 115 Saybolt at 100° F.

When a combined insecticidal and fungicidal oil spray is required the raw reaction product obtained by my process above referred to and containing a mixture of secondary alkyl phenol and aryl alkyl ether may be advantageously used to bring the rotenone and rotenoids into solution in the oil. Such an oil will have an increased insecticidal and fungicidal value, the latter being due to the presence of secondary alkyl phenol.

Having thus described my invention what I claim is:

1. An insecticidal preparation, comprising a relatively non-volatile petroleum oil, insecticidal material selected from the group consisting of rotenone and rotenoids, and an aryl alkyl ether, the amount of aryl alkyl ether being sufficient to keep the insecticidal material dissolved in the petroleum oil.

2. An insecticidal composition consisting of a non-volatile viscous petroleum oil containing not less than 0.1% of insecticidal material selected from the group consisting of rotenone and rotenoids and not less than 0.3 to 1.5% of aryl alkyl ether, the amount of aryl alkyl ether being sufficient to keep the insecticidal material dissolved in the petroleum oil.

3. An aqueous emulsion containing less than 2% of the composition according to claim 2.

4. An insecticidal preparation comprising a relatively non-volatile petroleum oil, an insecticidal material selected from the group consisting of rotenone and rotenoids and a secondary hexyl phenyl ether, the amount of secondary hexyl phenyl ether being sufficient to keep insecticidal material dissolved in the petroleum oil.

5. An insecticidal preparation comprising a relatively non-volatile petroleum oil, an insecticidal material selected from the group consisting of rotenone and rotenoids and a secondary hexyl cresyl ether, the amount of secondary hexyl cresyl ether being sufficient to keep insecticidal material dissolved in the petroleum oil.

HYYM E. BUC.